United States Patent [19]

Lindquist

[11] 3,997,085
[45] Dec. 14, 1976

[54] CAULKING GUN

[76] Inventor: Berkley James Lindquist, 857-84th Ave., NE., Minneapolis, Minn. 55432

[22] Filed: Jan. 15, 1976

[21] Appl. No.: 649,276

[52] U.S. Cl. .................. 222/326; 92/250; 222/391

[51] Int. Cl.² .......................... G01F 11/00

[58] Field of Search ............ 92/182, 203, 207, 250; 222/326, 327, 391

[56] References Cited

UNITED STATES PATENTS

| | | | |
|---|---|---|---|
| 2,634,888 | 4/1953 | Sherbondy | 222/391 X |
| 2,731,176 | 1/1956 | Crewe | 222/391 X |
| 3,409,185 | 11/1968 | Sundholm | 222/326 |

Primary Examiner—Allen N. Knowles
Assistant Examiner—Hadd Lane
Attorney, Agent, or Firm—Wicks & Nemer

[57] ABSTRACT

A caulking gun including a barrel having a dispensing tip on the outer end and a mechanism for releasably connecting the tip in sealing engagement with the outer end of the barrel. The barrel has a handle mounted on the inner end thereof with a trigger pivotally mounted on the handle. A rod extends within and from the inner end of the barrel with a piston on the rod and within the barrel. A dog having a hole therethrough and through which the rod extends to allow canting movement of the dog on the rod. The trigger has a lug thereon for engagement with one end of the dog to cant the dog in one direction on the rod to grip and advance the rod and the piston thereon in the barrel as the trigger is pivotally actuated. The handle carries a mechanism for canting the dog in the other direction free of gripping engagement with the rod when the rod is moved into the barrel whereby the rod and the piston thereon may be withdrawn from the barrel free of the dog for filling of the barrel. The body has a multiplicity of spaced notches formed in the periphery of the body and extending radially inwardly of the body to a depth greater than that of the ring grooves. The second face is formed with a domed surface, and a circular leather cup is mounted on the domed surface together with a stop bar on the rod and a nut on the end of the rod. With a turning up or off of the nut the diameter of the leather is thereby selectively changed.

13 Claims, 9 Drawing Figures

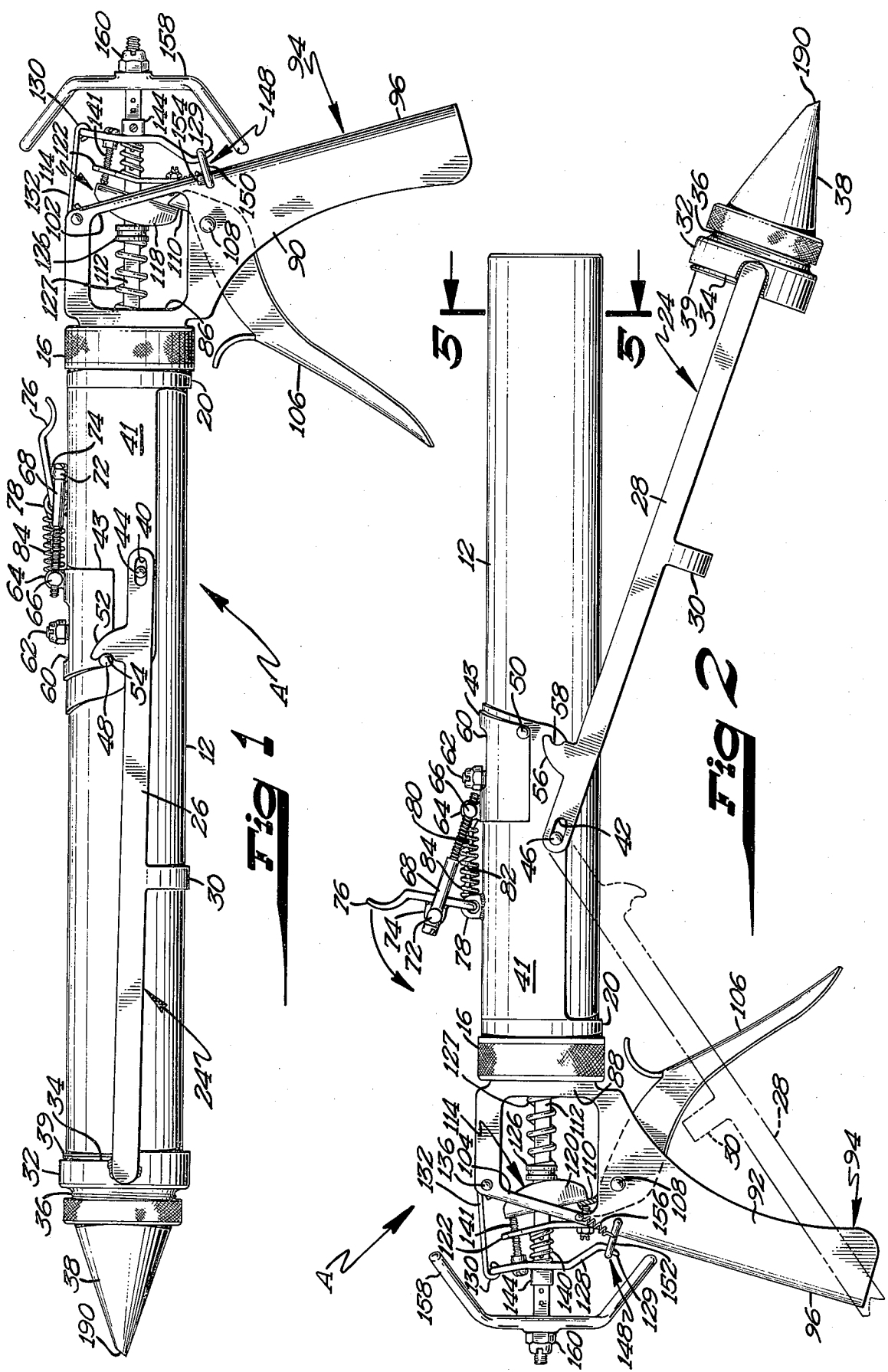

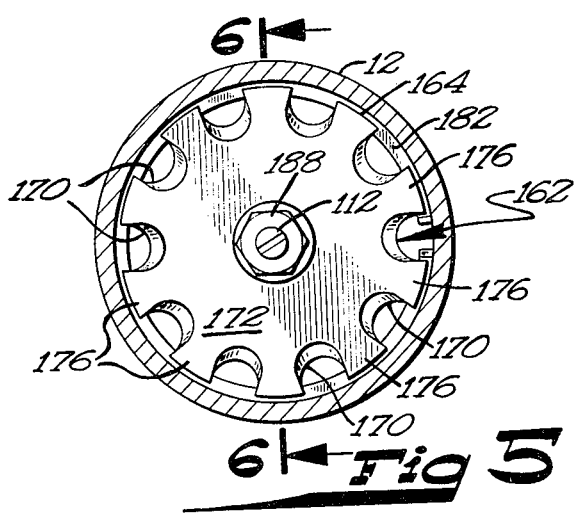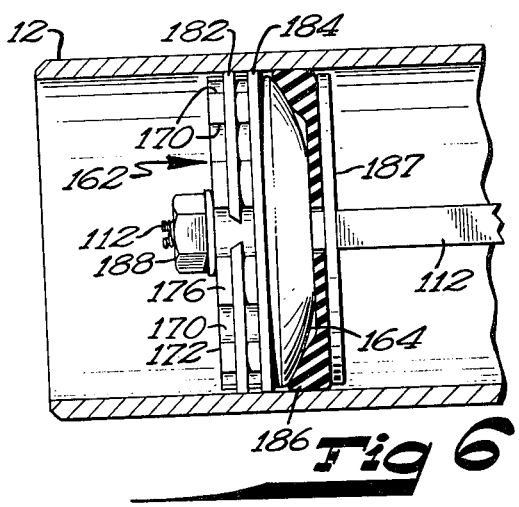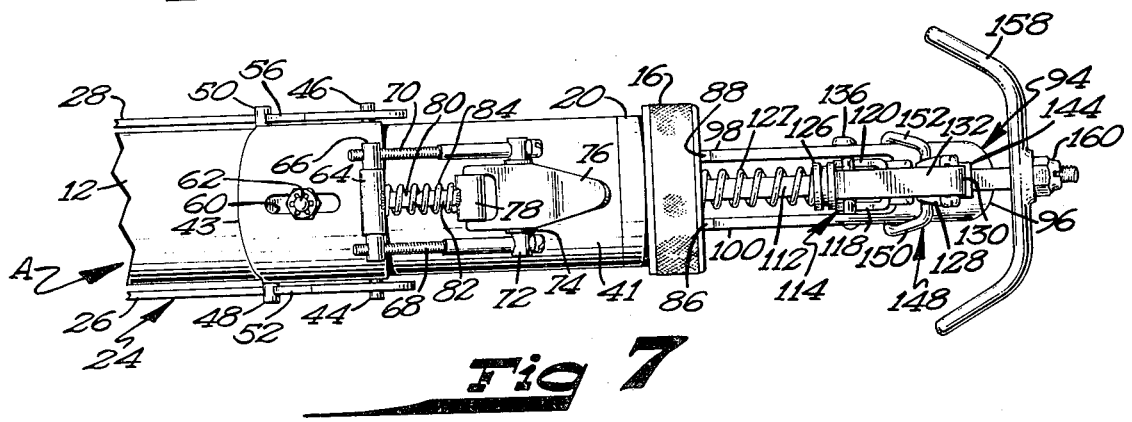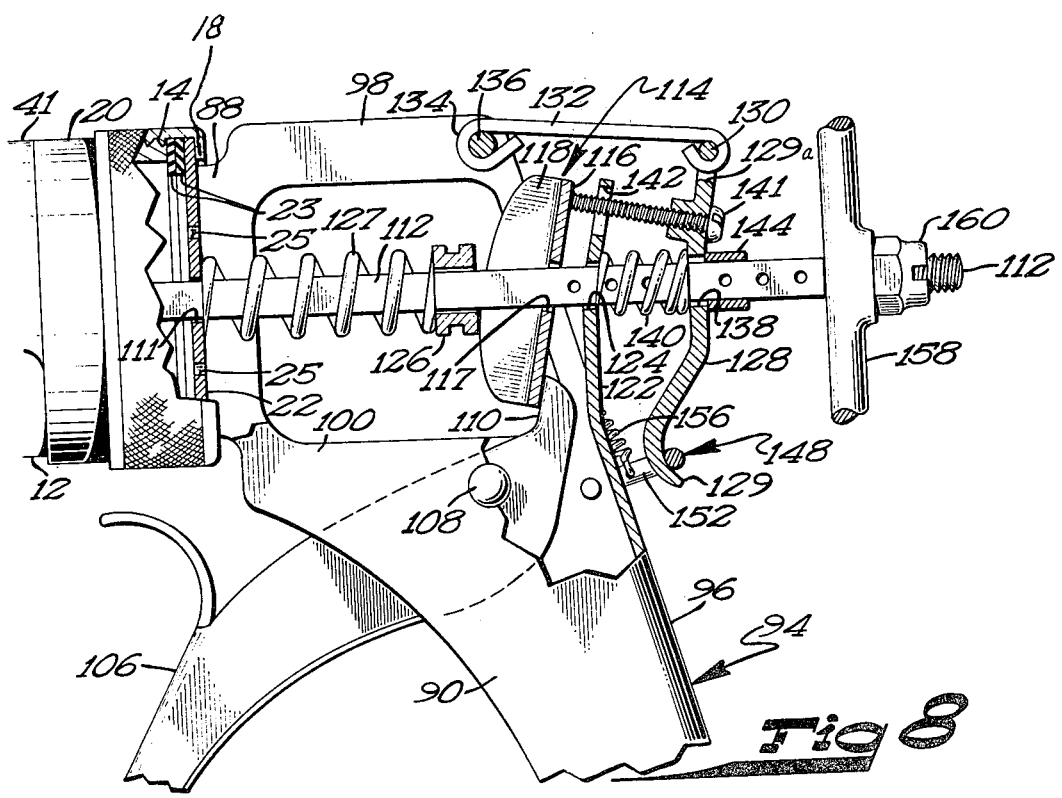

CAULKING GUN

SUMMARY

The invention relates to an improvement in caulking guns. It is an object of the invention to provide a caulking gun which has a mechanism which allows a quick, easy and positive removal of the tip of the gun from the end of the barrel whereby the barrel may be filled with caulking compound or the piston removed for cleaning. It is a further object to provide a caulking gun having a trigger mechanism for advancing the piston in the barrel including mechanism for deactivating the advancing mechanism thereby allowing quick withdrawal of the rod and piston thereon in the barrel for refilling of the barrel.

It is an additional object to provide a piston on the actuating rod which maintains positive sealing contact with the inner surface of the gun barrel, the amount of contact being adjustable with the piston mounting both a leather and a pair of compressible rings.

The invention will appear more clearly from the following detailed description when taken in connection with the accompanying drawings, showing by way of example a preferred embodiment of the inventive idea wherein like numerals refer to like parts throughout.

In the drawings forming part of this application:

FIG. 1 is a side elevational view of a caulking gun embodying the invention.

FIG. 2 is a view similar to FIG. 1 but with the front closure cap in a released and open condition and the cap cradle member shown in a fully released and rearward position in broken lines.

FIG. 5 is a sectional view on the line 5—5 of FIG. 2.

FIG. 6 is a sectional view on the line 6—6 of FIG. 5 but with the piston shown in full lines.

FIG. 7 is a top plan view of the rear end portion of the gun.

FIG. 8 is a side elevational view of a portion of the rear end of the gun partially in section with the bar advancement dog in released position.

Figure 3:
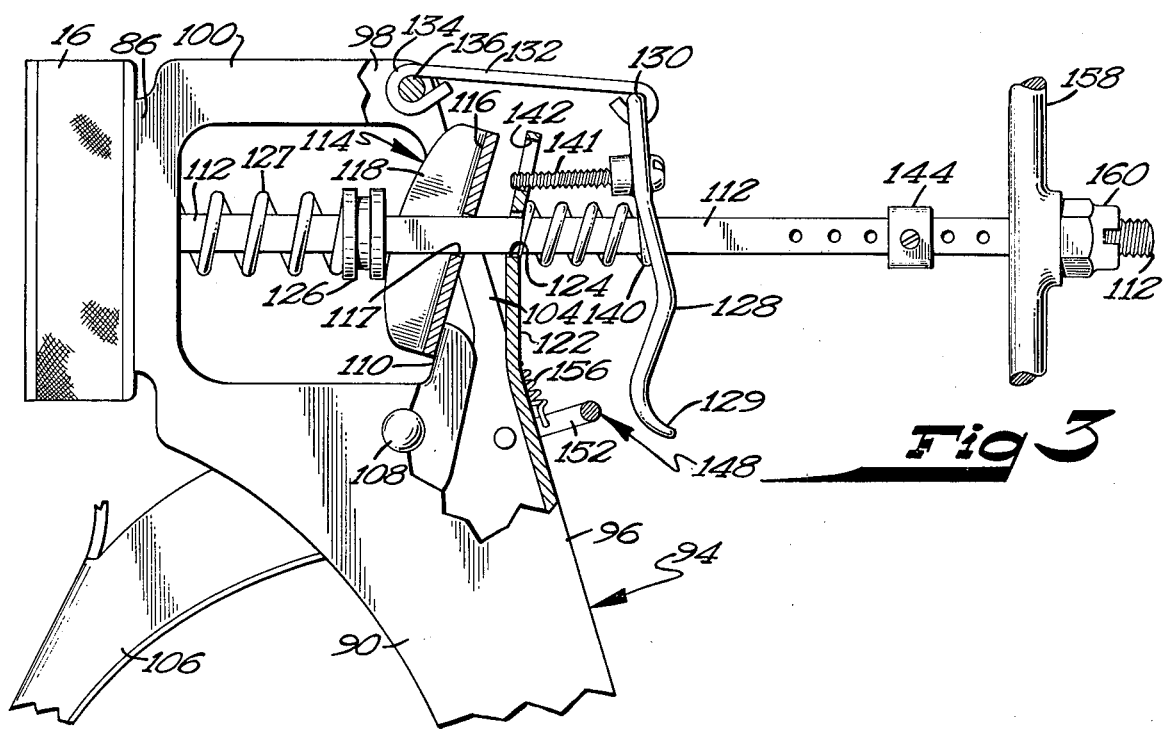
FIG. 3 is a side elevational view of a portion of the rear end of the gun partially in section with the trigger in released condition.

Referring to the drawings in detail, the gun A includes the barrel 12 which is threaded at the rear end as at 14 for receiving the threaded ring 16 formed with the radially directed flange 18 which forms a collar. Secured to the barrel 10 and adjacent to the threaded portion 14 is the annular stop 20 the purpose of which will be explained hereinafter. Positioned between the end of the barrel and the circular closure plate 22 are the two washers 23, with the plate in abutment with the flange 18, particularly FIG. 8. The washers allow an adjustment hereinafter described. The plate 22 is formed with holes 25 for air escape in the barrel and the plate is rotatable within the ring 16 and flange 18.

Further provided is the cradle 24 which includes a first side arm 26 and a second side arm 28 with the side arms connected by the arcuate connector strap 30. The outer ends of the side arms are connected to the collar 32. The collar 32 is reduced in width half of its diameter as at 34 for the purpose hereinafter described. The collar 32 is formed with a threaded forward portion as at 36 which threadedly receives the threaded dispensing tip 38. The collar 32 is equipped with a circular gasket 39, and the collar 32 and tip portion 38 form the gun tip.

Each of the side arms is formed at the inner end thereof with the elongated slot 40 and 42, respectively. Secured to the top of the barrel is the semi-cylindrical support 41. Further provided is the saddle 43 having a body semi-tubular in cross-section which has formed on the sides thereof the lugs 44 and 46 which are received in the slots 40 and 42, respectively, thereby pivotally mounting the cradle 24 on the support 41. The saddle has connected thereto on one side the lug 48 and on the other side the lug 50. Secured to the side arm 26 is the upstanding extension 52 formed with the notch 54 which receives the lug 48 as will be explained, and secured to the side arm 28 is the upstanding extension 56 formed with the notch 58 which receives the lug 50 also to be explained. The saddle 43 is formed with the slot 60 through which extends the stud 62 secured to the support half sleeve 41 thereby slidably mounting the saddle on the top of the support 41.

The saddle 43 is movable to actuate the cradle by means of the following. Secured to the rear end of the saddle is the bearing 64 in which is pivotally mounted the shaft 66. Connected at one end and to each end of the shaft 60 are the threaded adjustable arms 68 and 70 with the other ends of the arms connected to the ends of the shaft 72 pivotally mounted in the bearing 74. The bearing 74, is secured to the lever 76 pivotally mounted at the inner end on the lug 78 secured to the top of the half sleeve support 41. The numeral 80 designates a tab extending from the rear end of the saddle 43, and extending from the lug 78 in the tab 82. Positioned on the tabs 80 and 82 is the coil spring 84 which normally urges the saddle 43 from the lug 78.

As the lever 76 is pivoted from the position of FIG. 2 to that of FIG. 1 the saddle 43 is pulled rearwardly whereby the lugs 48 and 50 are moved into the notches 54 and 58 of the extensions 52 and 56 to thereby engage the collar 32 in sealing engagement upon the outer open end of the barrel. The slots 40 and 42 of the arms 26 and 28, respectively, move upon the lugs 44 and 46. Secured to the rotatable plate 22 are the spaced supports 86 and 88 the lower ends of which terminate in the spaced sides 90 and 92 of the handle 94 thereby allowing the handle to rotate on the barrel. The spaced handle sides are connected by the back piece 96. The upper ends of the supports 86 and 88 terminate in the top bars 98 and 100 which at the outer rear ends terminate in the spaced bars 102 and 104 which connect with spaced handle sides 90 and 92.

Additionally provided is the trigger 106 pivotally mounted at its upper end to the sides 90 and 92 of the handle 94 by means of the pin 108. The upper end of the handle is formed with the lug 110. The rotatable plate 22 at rear end of the barrel is formed with a square hole 111 to accommodate and through which the square rod 112 slides.

Positioned on the rod 112 is the dog 114 formed of the flat base portion 116 formed with the square hole 117 through which the rod 112 extends. The base portion 116 terminates on one edge in the right angle side wall 118 and on the other edge in the right angle side wall 120. Further provided is the handle extension plate 122 formed with the guide hole 124 through which the rod 112 extends. A shoulder collar 126 is slidable positioned on the rod 112, and positioned on the rod 112 and between the collar 126 and the plate 22 is the spring 127 thereby urging the collar against the dog and the dog against the lug 110 on the trigger 106 which maintains the trigger in the forward position as in FIGS. 1, 2, 3, and 8.

The numeral 128 designates a lever the upper end of which is formed with a slot 129a through which the half loop 130 of one end of the link 132 extends to thereby pivot the upper end of the lever 128 on the link 132. The other end of the lever is formed with the hook portion 129. The other end of the link 132 is formed with the half loop 134 which is connected upon the short cross bar 136. The lever 128 has a square hole 138 formed therein and through which the rod 112 extends. Positioned on the rod 112 between the extension plate 122 and the lever 128 is the coil spring 140 which normally urges the lever 128 in the slightly canted position of FIGS. 3 and 4.

Figure 4:
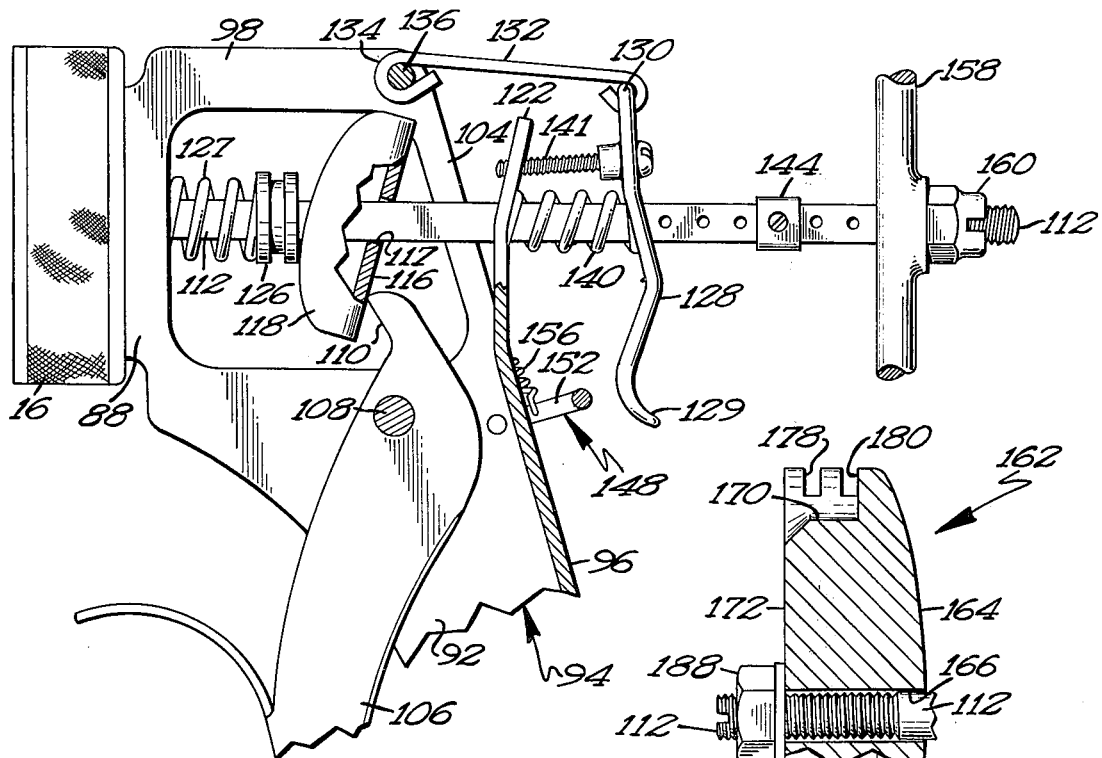
FIG. 4 is a view similar to FIG. 3 but with the trigger in push rod advancing position.

Mounted on the lever 128 adjacent the upper end thereof is the adjustable threaded pin 141 which extends through the hold 142 formed in the upper end of the extension plate 122, FIG. 3, and contactable with the top portion of the back plate portion 116 of the dog 114 as hereinafter described. Also provided is the collar 144 adjustably secured on the rod 112 the purpose of which will be hereinafter described.

The numeral 148 designates a pivotal U-shaped half ring catch having the outer ends of the legs 150 and 152 thereof pivotally mounted in holes formed in the sides 90 and 92 of the handle 94. The half ring catch 148 is urged to an upwardly disposed position as in FIGS. 1, 2 and 8 against the stop 154, FIG. 1, by means of the coil spring 156 secured at one end to the bar 104 and at the other end to the leg 152 of the loop catch 148.

A pull handle 158 is mounted on the outer end of the rod 112 and secured by the nut 160.

Figure 5A:
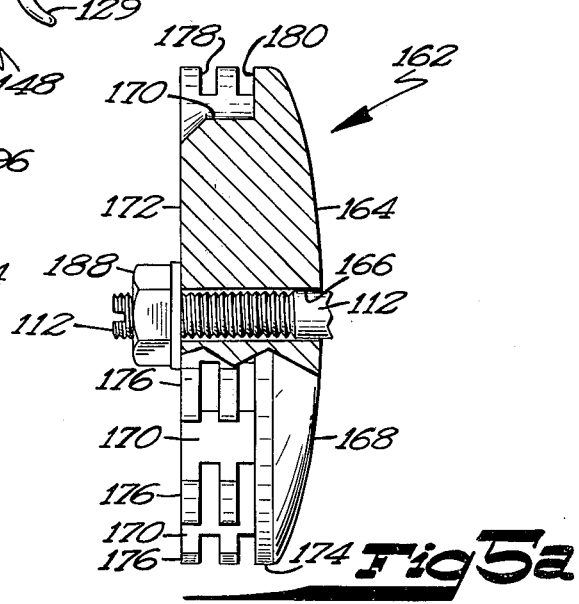
FIG. 5a is a partial sectional view through the piston.

The numeral 162 designates a piston member, FIGS. 5, 5a and 6, mounted on the forward end of rod 112. The piston includes the circular body member 164 formed with the axial hole 166. The body also includes the domed second face surface 168. The outer peripheral portion of the body is formed with the spaced notches 170 which extend longitudinally from the first face surface 172 of the body member to the annular flattened portion 174 of the body. The spaced recesses produce the ring-supporting lug formations 176 which have formed therein the two ring grooves 178 and 180 in which the rings 182 and 184 are positioned. Mounted on the shaft 112 is the conventional leather cup 186 positioned upon and between the domed surface 168 and the washer stop support 187. The stop support 187 is secured to the rod 112. As the nut 188 is tightened on the rod 112 against the piston the domed surface is forced into the leather cup 186 thereby spreading the cup and increasing the diameter of the cup with the resultant greater sealing pressure against the inside of the barrel. The diameter of the leather is changed by means of the nut 188 depending upon the viscosity of the caulking compound used. For example, with a heavier compound the diameter of the leather is increased as above to create greater sealing pressure on the inside of the barrel. The diameter of the leather is increased when using a relatively thick caulking compound by tightening up the nut 188 whereby the domed surface 168 is forced into the leather 186, and by the same token, release of the nut decreases the diameter of the leather for use when a caulking compound of a thinner viscosity is used.

OPERATION

Let it be assumed that the gun A is in the condition of FIG. 2 and in such condition the outer end of the gun barrel may be inserted into a supply of cleaning liquid. The handle 188 is then pulled outwardly thereby withdrawing the piston 162 into the barrel whereby cleaning material is sucked into the barrel where it travels through the recesses 170 and outwardly between the rings of the piston 162 to thereby cleanse the piston. The barrel is then filled with caulking compound with the piston withdrawn into the barrel to the rear end thereof by means of the handle and rod 112.

The cradle 24 is then pivoted upwardly on the pins 46 and 48 from the position of FIG. 2 to that of FIG. 1 with the collar 32 in alignment with the end of the barrel. The lever 76 is then moved from its forward or released position of FIG. 2 to the over dead center and clamping position of FIG. 1. As a result the saddle 43 is moved rearwardly thereby engaging the lugs 48 and 50 in the notches 54 and 58, respectively, and forcing the gasket 39 of the collar 32 in sealing engagement upon the end of the barrel.

With lever 128 in engagement with the half ring 148 the pin 141 moves the dog 114 to a position of nonengagement with the rod 112, and as a result the rod 112 may be withdrawn to its fullest extent as heretofore referred to thereby placing the piston 162 at the innermost position in the barrel.

With the gun filled with caulking compound, the handle 158 withdrawn to the full position and the lever 128 disengaged from the half ring 148, the trigger may be repeatedly actuated, whereby the lug 110 engages the dog 114 on rod 112 in canted position thereby advancing the rod with each action of the trigger. As a result the rod 112 and the piston thereon are forced through the barrel thereby pushing the caulking compound in the barrel out the open end 190 of the tip 38. As the collar 144 proceeds with the rod 112 the same finally contacts the lever 128 and pivots the lever whereby the hook end 129 contacts the half ring catch 148 and pivots the catch downwardly against the action of the spring 156 and with further movement of the lever 128 by the rod 112 the hook end passes over the catch 148 so that the catch 148 pivots upwardly due to the action of the spring 156 and engages the hook end 129 of the lever 128 and holds the lever 128 in the position of FIGS. 1, 2 and 8. In this position of lever 128, the pin 141 carried by the lever forces the dog to a position on the rod 112 which is less canted and in which position the dog 114 is deactivated with no gripping relation with the rod. As a result of the deactivating of the dog 114 the rod 112 may be withdrawn from the barrel with the piston retracted to the rear end of the barrel for further use as above. Before using the trigger again the catch-loop 148 must be disengaged from the hook end 129 of the lever 128 to thereby activate the dog 114 by allowing it to grip the rod as the trigger is actuated.

To open the gun the lever 76 is moved from the position of FIG. 1 to the released position of FIG. 2 whereby the cradle 24 and tip 38 thereon may be dropped from the barrel as illustrated in FIG. 2. The cradle 24 may also be pivoted to the position shown in FIG. 2 on broken lines thereby clearing the same free of the outer end of the barrel for the cleaning and filling operation.

The handle 94 and the mechanism carried thereby and associated with the barrel may be positioned longitudinally relative to the inner-end of the barrel at plate 22 by increasing or decreasing the number of washers 23 between the end of the barrel and the flange 18 of the threaded ring 16. The washers take up slack and with the proper number the handle assembly pivots on the barrel as highly desirable in using the gun. The collar 144 may be released and moved backwardly on the rod whereby the rod 112 can be pushed forward so that the piston is pushed out of the forward end of the barrel for cleaning or replacement.

In the event of different tolerances in constructing the saddle and support 41 and lugs thereon the rods 68 and 70 may be adjusted to compensate for the same. The pin 141 is adjusted to position the dog properly to deactivate the dog as hereinbefore described.

Having thus described the invention, what is claimed as new and desired to be secured by Letters Patent is:

1. A caulking gun comprising in combination:
  a. a barrel having an inner and outer end,
  b. a dispensing tip,
  c. means for releasably connecting said tip in sealing engagement with the outer end of said barrel,
  d. a closure plate carried by the inner end of said barrel,
  e. a handle,
  f. means mounting said handle on said closure plate,
  g. a trigger pivotally mounted on said handle,
  h. a rod extending through an opening in said handle and an opening in said closure plate and extending within said barrel and outwardly of the rear end thereof,
  i. a piston carried by one end of said rod and within said barrel,
  j. a dog having a hole therethrough and through which said rod extends to allow a canting movement of said dog on said rod,
  k. said trigger having a lug thereon for engagement with one end of said dog to cant said dog in one direction on said rod to grip and advance the rod and the piston thereon in the barrel for forcing caulking material outwardly through said tip as said trigger is pivotally actuated,
  l. means normally urging said dog rearwardly on said rod and against said lug on said trigger,
  m. means carried by said handle for canting said dog in the other direction free of gripping engagement with said rod when said rod is moved into said barrel whereby said rod and piston thereon may be withdrawn in said barrel free of said dog to allow filling of the barrel with caulking material.

2. The device of claim 1 in which said means for releasably connecting said tip in sealing engagement with the end of the barrel includes:
  a. a collar connected to said tip,
  b. a cradle pivotally and slidably mounted on said barrel and connected to said collar, and,
  c. lock means slidably mounted on said barrel for engaging said cradle sliding it rearwardly on said barrel to seal the collar of the tip with the end of the barrel.

3. The device of claim 2 in which said lock means slidably mounted on said barrel for engaging said cradle includes,
  a. a lever pivotally mounted on said barrel,
  b. a saddle slidably mounted on said barrel,
  c. rod means connecting said lever with said saddle,
  d. spring means normally urging said saddle from said lever, said lever movable from one position to a position over dead center against the action of said spring means thereby drawing said saddle towards said lever for engagement with said cradle.

4. The device of claim 3 in which said means carried by said handle for canting said dog in the other direction free of said rod includes:
  a. a lever pivotally mounted on said handle,
  b. spring means normally urging said lever pivotally rearwardly of said handle,
  c. said rod having a stop thereon,
  d. a half ring pivotally mounted on said handle,
  e. means normally urging said half ring towards said rod,
  f. a pin carried by said lever,
  g. said stop engageable with said lever as said rod is advanced thereby pivoting said lever to depress said half ring away from said rod and engage said lever with said half ring whereby said pin contacts said dog and cants the dog free of gripping engagement with said rod.

5. The device of claim 3 in which said saddle includes,
  a. semi-tubular body.

6. The device of claim 2 in which said cradle includes:
  a. a pair of spaced side arms connected at the outer ends to said collar,
  b. the inner ends of said side arms having slots,
  c. a lug formed on each side of said barrel and extending into said slots.

7. The device of claim 1 in which said piston includes:
  a. a generally cylindrical body having first and second opposed end faces,
  b. a rod,
  c. said body having an axial hole through which said rod extends,
  d. at least one ring groove formed in the periphery of said body and extending radially inwardly thereof,
  e. a ring in said ring groove,
  f. a multiplicity of spaced notches formed in said body at the periphery thereof extending radially inwardly of the body and longitudinally of the body from said first face and to a radial depth greater than that of said ring groove thereby allowing a fluid to enter said notches at said first face and pass through said recesses and under said rings to thereby allow said rings and said grooves to be cleaned by a fluid,
  g. said second face having a domed surface.
  h. a circular leather cap mounted on said domed surface,
  i. means maintaining said leather cup in adjustable pressing engagement upon said domed surface for varying degrees of peripheral contact with the inner surface of the barrel.

8. The device of claim 1 in which said means normally urging said dog rearwardly on said rod and against said lug on said trigger is a coil spring mounted on said rod between said closure plate and said lug.

9. The device of claim 1 in which said closure plate is rotatably mounted on the inner end of said barrel to allow pivotal movement of the handle upon the barrel.

10. A piston and rod for the barrel of a caulking gun comprising:
  a. a generally cylindrical body having first and second opposed end faces, b. a rod,
c. said body having an axial hole through which said rod extends,
d. at least one ring groove formed in the periphery of said body and extending radially inwardly thereof,
e. a ring in said ring groove,
f. a multiplicity of spaced notches formed in said body at the periphery thereof extending radially inwardly of the body and longitudinally of the body from said first face and to a radial depth greater than that of said ring groove thereby allowing a fluid to enter said notches at said first face and pass through said recesses and under said rings to thereby allow said rings and said grooves to be cleaned by a fluid,
g. said second face having a domed surface,
h. a circular leather cup mounted on said domed surface.
i. means maintaining said leather cup in adjustable pressing engagement upon said domed surface for varying degrees of peripheral contact with the inner surface of the barrel.

11. The device of claim 10 in which said means maintaining said leather cup in adjustable pressing engagement upon said domed surface includes:
 a. a stop carried by said rod against which said body is positioned,
 b. a nut threadedly engaged on said rod for draw-up against said body.

12. A caulking gun comprising in combination:
 a. a barrel having an inner and outer end,
 b. a dispensing tip carried by said barrel,
 c. a closure plate carried by the inner-end of said barrel,
 d. a handle,
 e. means mounting said handle on said closure plate,
 f. a trigger pivotally mounted on said handle,
 g. a rod extending through an opening in said handle and an opening in said closure plate and extending within said barrel and outwardly of the rear end thereof,
 h. a piston carried by one end of said rod and within said barrel,
 i. a dog having a hole therethrough and through which said rod extends to allow a canting movement of said dog on said rod,
 j. said trigger having a lug thereon for engagement with one end of said dog to cant said dog in one direction on said rod to grip and advance the rod and the piston thereon in the barrel for forcing caulking material outwardly through said tip as said trigger is pivotally actuated,
 k. means normally urging said dog rearwardly on said rod and against said lug on said trigger, and
 l. means carried by said handle for canting said dog in the other direction free of gripping engagement with said rod when said rod is moved into said barrel whereby said rod and piston thereon may be withdrawn in said barrel free of said dog to allow filling of the barrel with caulking material.

13. The device of claim 12 in which said means carried by said handle for canting said dog in the other direction free of said rod includes:
 a. a lever pivotally mounted on said handle,
 b. spring means normally urging said lever pivotally rearwardly of said handle,
 c. said rod having a stop thereon,
 d. a half ring pivotally mounted on said handle,
 e. means normally urging said half ring towards said rod,
 f. a pin carried by said lever,
 g. said stop engageable with said lever as said rod is advance thereby pivoting said lever to depress said half ring away from said rod and engage said lever with said half ring whereby said pin contacts said dog and cants the dog free of gripping engagement with said rod.

* * * * *